March 7, 1961

N. C. PRICE 2,973,921

WINGLESS SUPERSONIC AIRCRAFT

Filed March 24, 1958

INVENTOR.
NATHAN C. PRICE
BY
George C. Sullivan
Agent

March 7, 1961  N. C. PRICE  2,973,921
WINGLESS SUPERSONIC AIRCRAFT
Filed March 24, 1958  5 Sheets-Sheet 2

INVENTOR.
NATHAN C. PRICE
BY
George C. Sullivan
Agent

March 7, 1961   N. C. PRICE   2,973,921
WINGLESS SUPERSONIC AIRCRAFT
Filed March 24, 1958   5 Sheets-Sheet 3

INVENTOR.
NATHAN C. PRICE
BY
George C. Sullivan
Agent

March 7, 1961 N. C. PRICE 2,973,921
WINGLESS SUPERSONIC AIRCRAFT
Filed March 24, 1958 5 Sheets-Sheet 5

INVENTOR.
NATHAN C. PRICE
BY
Agent

United States Patent Office 2,973,921
Patented Mar. 7, 1961

2,973,921

WINGLESS SUPERSONIC AIRCRAFT

Nathan C. Price, Geneva, Switzerland
(424¼ Kelton Ave., Westwood, Calif.)

Filed Mar. 24, 1958, Ser. No. 723,434

25 Claims. (Cl. 244—12)

This invention relates to a supersonic wingless aircraft, and relates more particularly to improvements in a supersonic wingless aircraft capable of vertical, or substantially vertical ascent or descent during takeoff and landing with efficient performance at low, intermediate and high altitude flights at subsonic or supersonic speeds combined with being economically advantageous for short, medium and long ranges.

The basic aircraft on which this invention is an improvement is covered by my copending application Serial Number 677,877, filed August 13, 1957. The main differences between this invention and my copending application resides in a more aerodynamically efficient fuselage shape in conjunction with a more positive, effective and efficient control of air in the propulsive system; the more aerodynamically efficient fuselage permitting a relocation of the jet efflux openings producing vertical lift and descent during VTOL operations and aircraft directional control, such relocation additionally resulting in reduction of the operational noise level of the aircraft.

Accordingly, it is an object of this invention to provide aircraft of the type described having a more aerodynamically efficient fuselage.

A further object of this invention is to provide aircraft of the type described with a fuselage having a higher $L/D$ ratio at all flight speeds.

It is a further object of this invention to provide aircraft of the type described having a high utilization of volumetric capacity in a fuselage having an inherently high $L/D$ ratio.

A still further object of this invention is to provide aircraft of the type described having a fuselage permitting shorter landing gear, a lower position of loading doors relative to the ground level, a lower aircraft center of gravity relative to the ground level, and a wider landing gear tread (the last two factors minimizing the danger or chances of rolling over in an emergency landing or while taxiing on the ground) without jeopardizing or reducing the fuselage $L/D$ ratio at any flight speed.

A further object of the invention is to provide a more effective means of re-starting turbojets during flight, or of starting a turbojet when less than all the turbojets are operating.

Another object of this invention is to provide an aircraft of the type described having a more positive, effective and efficient propulsion system air control.

It is a still further object of this invention to provide an aircraft of the type described having a reduced operational noise level.

It is another object of this invention to provide an aircraft with an exceptionally high ratio of useful load to gross weight for economical operation at a wide diversity of short, medium, and long stage distances.

Other objects and advantages will become apparent from the following description taken in connection with the accompanying drawings in which.

Generally stated, the invention is practiced in one embodiment by employing a fuselage that is substantially conical shaped at the forward end for a short length where the conical shape is transformed into a shape composed of two surfaces. The upper surface forms a semi-circular shape of increasing radius to a mid-length point of the fuselage, after which the semi-circular radius is substantially constant. The lower surface forms a flat triangle bounded laterally by slightly conical surfaces of decreasing radii in a rearward direction from the forward point or apex of the flat triangular surface to the point mid-length of the fuselage. The intersection of the upper and lower surfaces forms a chine-line on both sides of the fuselage extending from the sides of the inlet to the mid-length fuselage point. Angulated regions are formed by the chines, beneath which lateral extending, downward facing, vertical lift efflux nozzles or slots are placed without destroying the smooth external aircraft contour and forming spill-breakers to increase the inherent fuselage $L/D$ ratio at all flight speeds. The aft end of the semi-circular or hemispherical transverse fuselage shape fairs into a rectangular assembly comprising a bi-lateral main propulsive nozzle for producing pitch, roll and yaw moments in the aircraft fuselage.

The sheet jet efflux from the nozzles or slots beneath the chines has a rapid rate of mixture with the ambient air resulting in relatively low operational noise levels comparative to circular nozzle openings of large diameter. Furthermore, these jet efflux sheets are characterized by noise of relatively high frequency, rather than low frequency, so that the noise attenuates rapidly with distance.

Included in the propulsion system air inlet is a ram air spill gate and a turbojet starting spill gate allowing an efficient disposal of excess ram air which produces lift, and without encountering spill at the air inlet entrance or lip and a less rigorous starting cycle for each of the turbojet powerplants without encountering possible back pressure damages. Spill is avoided to improve the $L/D$ ratio of the airplane. Additional propulsion system fluid control means are included to provide a continuous smooth flow during either the turbojet or ramjet operating ranges.

Figure 1:
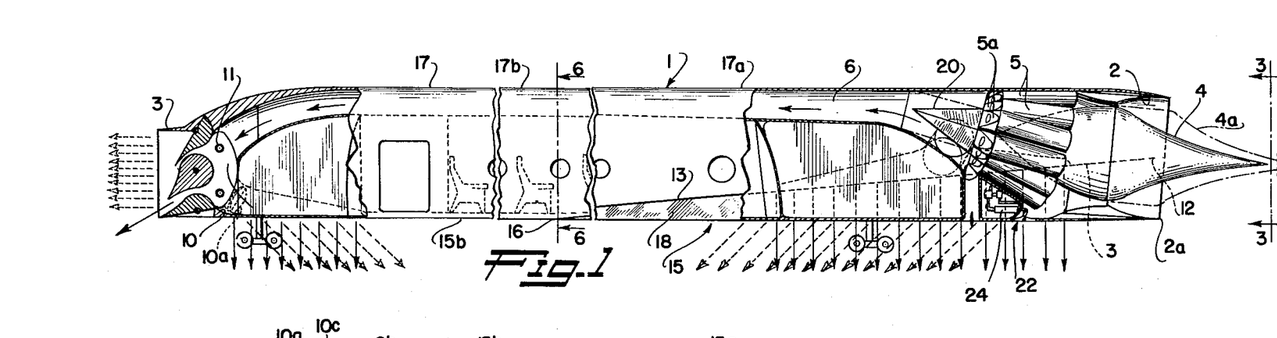
Figure 1 is an elevation view of partial cross-section of an aircraft showing one embodiment of this invention.
Figure 7:
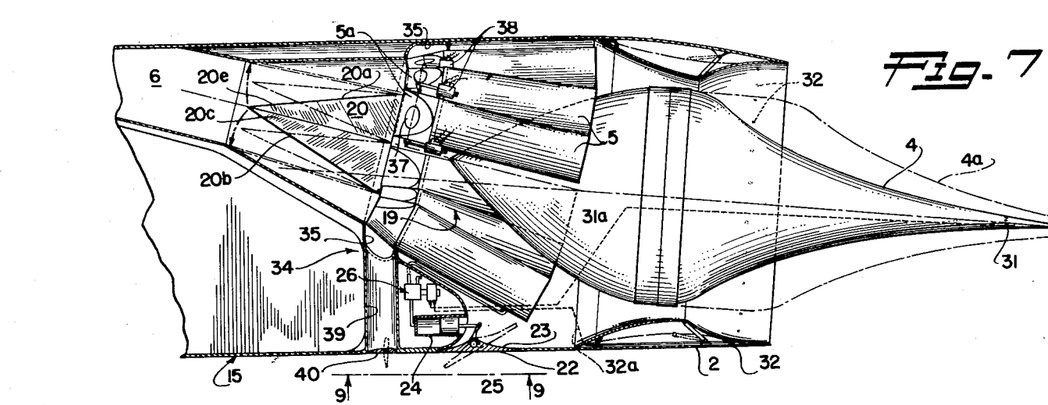
Figure 7 is an enlarged elevation view of partial cross-section of the forward portion of the aircraft shown in Figure 1, showing the ram inlet and powerplants in greater details.
Figure 8:
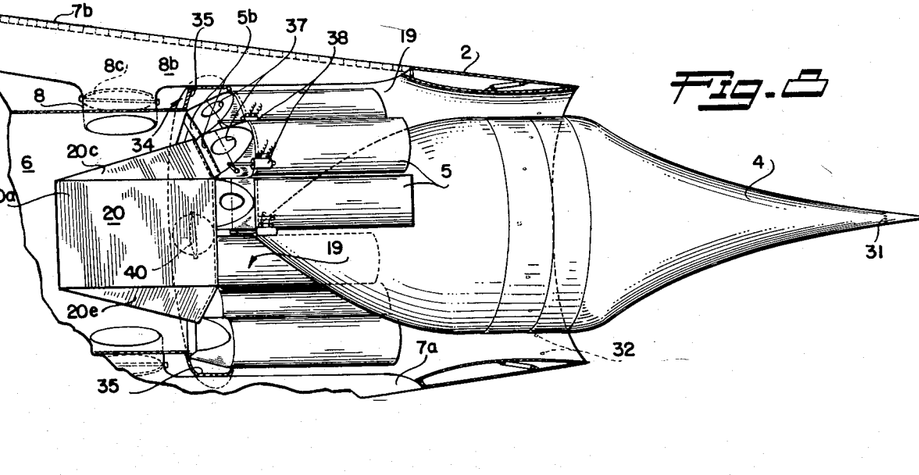
Figure 8 is a plan view of partial cross-section of the portion of the aircraft shown in Figure 7.

Referring more particularly to the drawings, in Figure 1 there is shown an aircraft fuselage of some similarity to the basic aircraft shown in my copending application Serial Number 677,877, filed August 13, 1957. The fuselage 1 has a ram inlet 2 at the forward end thereof and a variable and controllable propulsive nozzle 3 at the aft end thereof. Ram inlet 2 is of the variable geometry type having an axially adjustable needle or spike 4 and a radially adjustable outer duct wall located therein. The position of needle 4 when extended is indicated by phantom lines 4a in Figures 1, 2 annd 7. Details of the ram inlet 2 just described form the subject matter of my copending application Serial Number 717,427 filed February 25, 1958.

Located in the diffuser portion of ram inlet 2 are a plurality of turbojet powerplants 5 which discharge combustion gases through turbojet exhaust nozzles 5a into a longitudinal duct 6 for passage aft through fuselage 1 to propulsive nozzle 3. Longitudinal duct 6 is preferably composed of a plurality of smaller longitudinal passages 6a, 6b, 6c and 6d, as is more clearly shown in Figures 2 and 6, to delimit or prevent swirl or eddies of the fluid flow through longitudinal duct 6, and to structurally contain the pressure of exhaust gases within an oblate cross-sectional area requiring less height than a purely circular one.

For vertical takeoff and vertical ascent and descent operation, there are forward and aft, downward-facing, elongated efflux nozzles along the chines of the fuselage. The right and left forward elongated efflux nozzles 7a and 7b respectively, are in communication with longitudinal duct 6 through lateral passages 8 and forward right and left chambers 8a and 8b respectively. The forward lateral passages 8 contain valves 8c for control of the reactive fluid to the forward elongated efflux nozzles 7 for vertical ascent or descent control.

The right and left rearward or aft elongated efflux nozzles 9a and 9b respectively are supplied with propulsive fluid from longitudinal duct 6 by rearward or aft lateral passages 10, which are controlled by valves 10a for controlling fluid flow from longitudinal duct 6 to right and left rearward or aft chambers 10b and 10c respectively, similar to the flow to the forward elongated efflux nozzles 7.

During high forward speed operation of the aircraft the turbojet powerplants 5 can be shut down and a ram air flow is maintainable without obstruction through longitudinal duct 6 for ram-jet operation. For such ram-jet operation there is a ram-jet burner means 11 interposed between the aft end of longitudinal duct 6 and propulsive nozzle 3.

Figure 2:
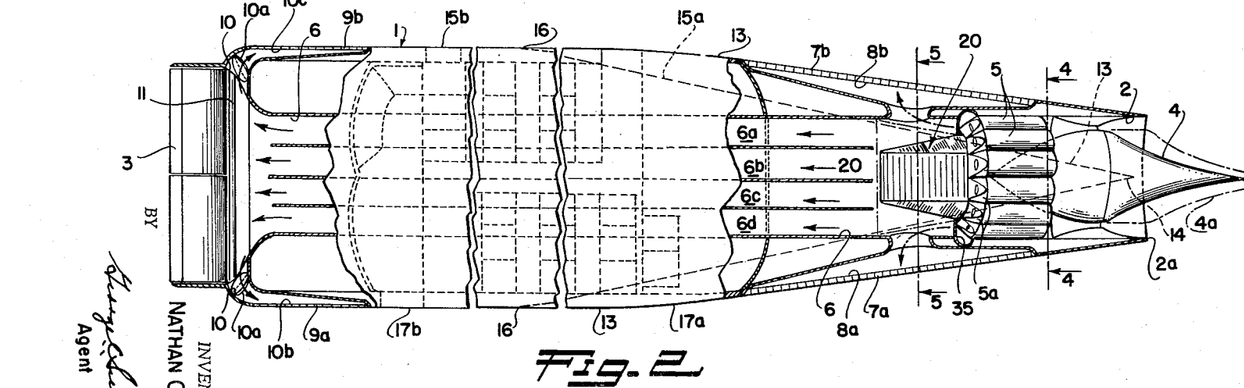
Figure 2 is a plan view of partial cross-section of the aircraft shown in Figure 1.
Figure 3:
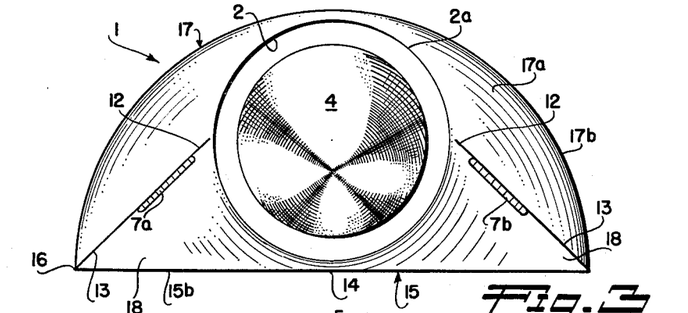
Figure 3 is a view taken along line 3—3 of Figure 1.
Figure 4:
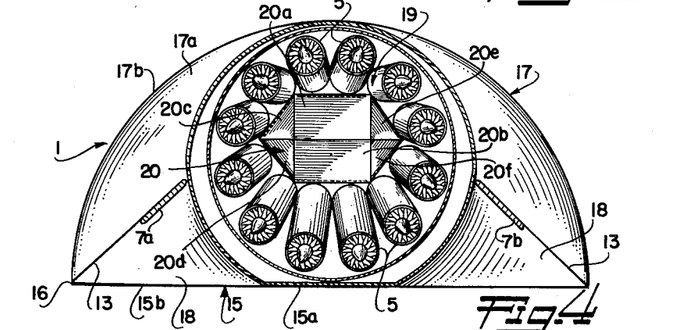
Figure 4 is a view taken along line 4—4 of Figure 2.
Figure 5:
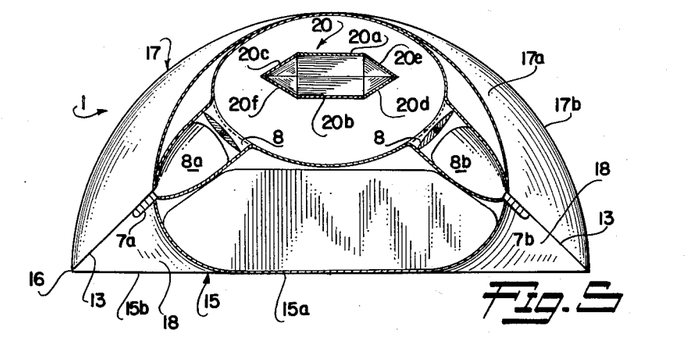
Figure 5 is a view taken along line 5—5 of Figure 2.

Aerodynamically efficient operation of the aircraft is accomplished by the shape of the outer fuselage surface permitting an inherently high $L/D$ (lift/drag) ratio at all stages of flight operation. Referring to Figures 1 through 6, the outer surface of fuselage 1 is substantially conical for a short distance from the lip 2a of inlet 2 to a point 12 where the chines 13 begin a sharp break in the smooth conical surface of the fuselage. Simultaneously with the beginning of chines 13 at point 12 there is a second point 14 which is the forward point or apex of a flat triangular surface 15a extending aft and forming the bottom surface 15 of the aircraft, which is composed of triangular surface 15a which extends rearward to a point 16 where the lower triangular fuselage surface 15a and chines 13 join at the lowermost horizontal plane of the fuselage 1. At point 16, the bottom triangular surface 15a also joins the bottom flat rectangular surface 15b of constant width as indicated in Figure 2, surface 15b extending in an aftward direction from point 16.

From point 12, the upper fuselage surface 17 extends rearward to point 16 as a cross-sectional hemispherical surface of increasing diameter or a semi-circular shape of increasing radius 17a, which changes to a semi-circular shape of constant radius 17b extending aft of point 16. Between forward points 12, 14 and mid-length fuselage point 16, the flat triangular surface 15a is bounded laterally by slightly conical surfaces 18, which are of decreasing radii in a rearward direction, surfaces 18 serving as a smooth lateral fillet between bottom triangular surface 15a and chines 13, the chines 13 serving as the point of intersection between the upper fuselage surface 17 and lower fuselage surface 15.

Figure 6:
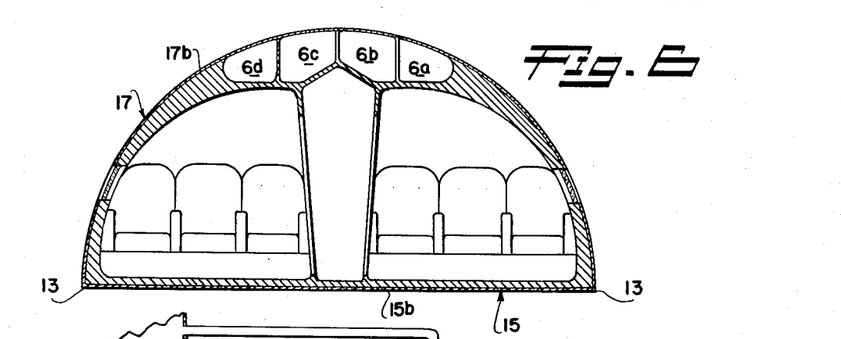
Figure 6 is a view taken along line 6—6 of Figure 1.

Thus, with the horizontal flat lower surface of the fuselage a shorter length landing gear can be utilized, in addition to the accomplishment of a lower relative position of loading doors to the ground level. Furthermore, a lower aircraft center of gravity relative to the ground level and use of a wider landing gear tread can be accomplished, which are both desirable and feasible from a safety aspect, without jeopardizing or reducing the inherent high $L/D$ ratio in the fuselage or the high utilization of volumetric capacity of the fuselage as can be seen in Figure 6. The chines are instrumental per se in suppression of air spill upwardly from beneath the fuselage during flight.

Figures 9, 10, 11, 12:
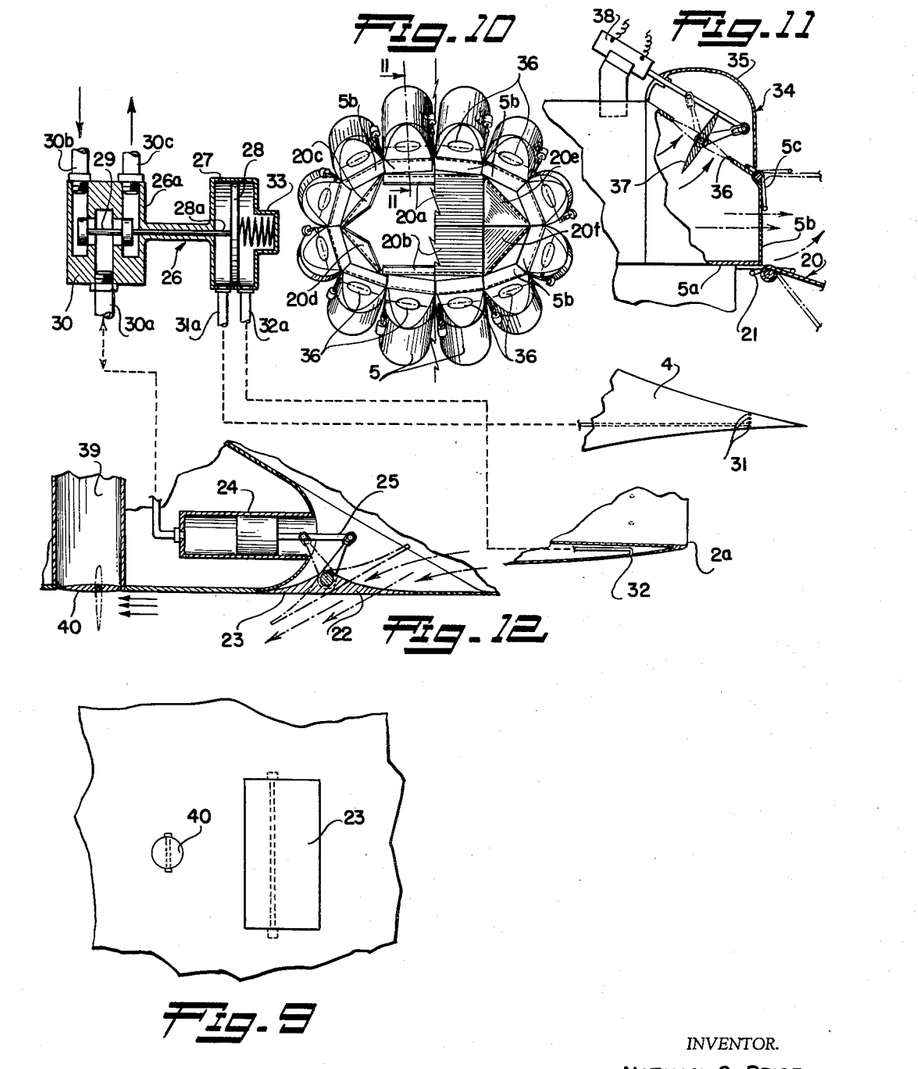
Figure 9 is a view taken along line 9—9 of Figure 7.
Figure 10 shows the engine cluster and ram air passage from a downstream point looking forward, which is opposite of the engine cluster and ram air passage view in Figure 4.
Figure 11 is a view taken along line 11—11 of Figure 10.
Figure 12 is a diagrammatic view of the control system for the ram air spill gate.

The cluster of turbojet powerplants 5 are disposed adjacent the back portion of needle or spike 4 so as to create an envelope for forming a ram air bypass passage 19 between the outer surface of needle 4 and ring of turbojet powerplants 5. Communication between ram air bypass 19 and longitudinal duct 6 is effected by a petal valve 20 comprising two rectangular members 20a and 20b, and four triangular members 20c, 20d, 20e and 20f, all of which are pivotally connected substantially coplanar with the ends of the turbojet exhaust nozzles 5a. The inter-relation of the six members of petal valve 20 can be most clearly seen in Figure 5. The phantom lines for petal valve 20 as shown in Figures 1, 2 and 7 indicate the positions of the individual valve members when the petal valve 20 is open. Figure 10 shows the members of petal valve 20 from a view downstream of the valve looking forward; the valve members on the right hand side of Figure 10 being shown in the open position. Each of the members of petal valve 20 are biased toward a closed position, such as by a coil spring 21, as can be most clearly seen in Figure 11, although actually any satisfactory biasing means may be used.

At the downstream end of each turbo-jet exhaust nozzle 5a there is a swing type check valve 5b which is pivoted at its radially outer end to the turbo-jet exhaust nozzle 5a. Each of the turbo-jet swing check valves 5b is slightly biased toward a closed position by a coil spring 5c similar to the coil or bias spring 21 for biasing the members petal valve 20 shut. The biasing means 5c for the check valve 5b and the similar means 21 for the petal valve 20 are very low in force so that only negligible pressure of gases is required to open these valves.

During operation of the turbo-jet powerplants 5, the ram air bypass passage 19 is closed by petal valve 20, petal valve 20 remaining closed by the pressure of the turbo-jet powerplant combustion gases reacting on the outer or downstream surfaces of the members of petal valve 20.

During ram-jet operation when the turbo-jet powerplants 5 are shut down, the ram air from inlet 2 passes into longitudinal duct 6 through the ram air bypass passage 19 and petal valve 20. The swing check valves 5b on the turbo-jet exhaust nozzles 5a are maintained in a closed position by the pressure of the ram air downstream of the petal valve 20 reacting upon the downstream side of the swing check valves 5b. The spring bias means on each of the swing check valves 5b or members of petal valve 20 assist initially in urging the individual valve members toward a closed position so that the appropriate fluid pressures can come into play to close and maintain closed the individual valve members.

Referring to Figures 7 and 12, there is a ram air spill gate means 22 located in the lower portion of the fuselage surface at a point slightly behind the forward end of the cluster of turbo-jet powerplants 5. The ram air spill gate means 22 comprises a rectangular pivoted valve member 23 that is slightly unbalanced so that the air pressure within the ram inlet diffuser will tend to keep the valve closed. Pivoted valve member 23 is controlled by a pneumatic servo cylinder 24 connected to the valve member 23 by linkage 25 (see Figure 12). Control of pneumatic servo cylinder 24 is accomplished through an air relay servo control means 26, the schematic details of which are shown in Figure 12. Control means 26 includes a casing 26a having a cylinder 27 adjacent one end thereof with a piston 28 therein. Extending from one side of the piston 28 is a rod or shaft 28a which in turn is connected to two-land servo-valve piston 29 whereby axial movement of piston 28 in cylinder 27 is translated to servo-valve piston 29 for controlling the entrance or exhaust of fluid pressure into pneumatic servo cylinder 24. The air relay means 30 comprises conduit passages 30a, 30b and 30c; passage 30a connects the interior of air relay 30 with the interior of pneumatic servo-cylinder 24, with passage 30b connected to any suitable source of fluid pressure, such as the subsonic diffuser section of the inlet, and passage 30c being connected to an atmospheric vent or exhaust. Position of the servo-valve piston 29 in the air relay 30 is controlled by the static pressure differential between a first set of pressure taps 31 located in a piezometer ring at the forward portion of the needle or spike 4 and a second set of pressure taps 32 located in a piezometer ring on the outer fuselage surface just downstream from inlet lip 2a and upstream from fuselage points 12 and 14. Other locations of pressure taps 31 and 32 may be utilized, the only requirement being that pressure taps 31 are located so as to be responsive to substantially ambient pressure, while pressure taps 32 are located so as to be responsive to pressure variations occurring due to ram air spill over inlet lip 2a. Pressure taps 31 transmit the static pressure signal from pressure taps 32. As soon as a condition of ram air spill over the inlet lip 2a occurs, the static pressure signal from pressure taps 32 will be greatly reduced, thus the static pressure signal level in conduit 31a will force piston 28 to overcome the bias of spring 33 and move forward, opening the pneumatic servo cylinder 24 to the atmospheric vent line 30c through air relay means 30. When this occurs the ram air pressure in the inlet diffuser will react upon the forward surface of the piston in pneumatic servo cylinder 24 causing the pivoted valve member 23 to open and thus permit the ram air spilling over the inlet lip 2a to pass through the open ram air spill gate means 22. When the static pressure signal levels from pressure taps 31 and 32 substantially balance out from the reduction of ram air spilling over inlet lip 2a, the spring 33 forces piston 28 in an opposite direction thus opening the closed side of the pneumatic servo-cylinder to the inlet diffuser pressure through conduit 30b, air relay means 30 and conduit 30a thus balancing the pressures on both sides of the piston in the pneumatic servo-cylinder 24. With such pressures balanced, the unbalanced pressure on the pivoted valve member 23 will cause the valve member to close thus stopping the spill of ram air through the ram air spill gate means 22. The control results in a condition of equilibrium with sufficient spillage through valve member 23 to prevent any substantial spill around the outside of inlet lip 2a, regardless of flight speed or altitude, and can compensate for stoppage of at least one powerplant should this occur during climb. The diagrammatic showing of control of the ram air spill gate means 22 as shown in Figure 12 is merely one embodiment thereof, it being understood that any appropriate control means capable of achieving the control effect of a ram air spill gate means can be used.

In order to accomplish the starting of a turbo-jet powerplant 5 at a time when less than all of the turbo-jet powerplants 5 are operating, a turbo-jet starting spill gate means 34 is incorporated by means of an annular connector ring 35 connected to a valved passage 36 in each of the turbo-jet exhaust nozzles 5a and controlled by a butterfly valve 37. Each butterfly valve 37 is actuated by an electric solenoid 38. The annular connector ring 35 communicates with an exhaust passage 39 that opens to the atmosphere at the lower portion of the fuselage just aft of the ram air spill gate 23. An unbalanced butterfly valve 40 controls communication between the exhaust passage 39 and the atmosphere exterior of the fuselage.

If some of the turbo-jet powerplants 5 are in operation and an additional turbo-jet powerplant 5 is to be brought into operation, the swing check valve 5b at the downstream end of the turbo-jet exhaust nozzle 5a is maintained closed by the pressure from the already operating turbo-jet powerplants reacting on the downstream side of the swing check valve 5b. The powerplant 5 to be brought into operation can be started by the pilot activating the appropriate electric solenoid 38 to open the valved passage 36 in the turbo-jet exhaust nozzle 5a to allow communication between the powerplant and the annular connector ring 35 venting the turbo-jet discharge to substantially atmospheric pressure. As the powerplant being brought into operation by rammed air pressure or other appropriate means comes up to sufficient speed so that the swing check valve 5b can be opened by exhaust gas pressure, the discharge from the engine will pass through the annular connector ring 35 into exhaust passage 39 and through the unbalanced butterfly valve 40, the discharge pressure through exhaust passage 39 forcing the valve 40 open, and thus venting the exhaust from the engine being started to the atmosphere. Without such a spill means, the swing check valve 5b would be held closed by the engines already in operation and there would be an excessive back pressure on the turbo-jet powerplant 5 that is being attempted to be started. Without the swing check valves 5b, there would be wasteful reverse flow and also possibility of damage occurring to the non-operating turbo-jet powerplants 5 when only a portion of them are in operation. With the turbo-jet starting spill gate means 34, as soon as the engine being brought into operation attains a substantial speed, the valve 37 can be closed by reactivation of solenoid 38 so as to cause the discharge of the turbo-jet powerplant 5 being brought into operation to open the appropriate swing check valve 5b, and thus the exhaust from that engine will join or combine with the exhaust from the already operating turbo-jet powerplants 5 and add to the fluid flow in longitudinal duct 6.

Figure 13:
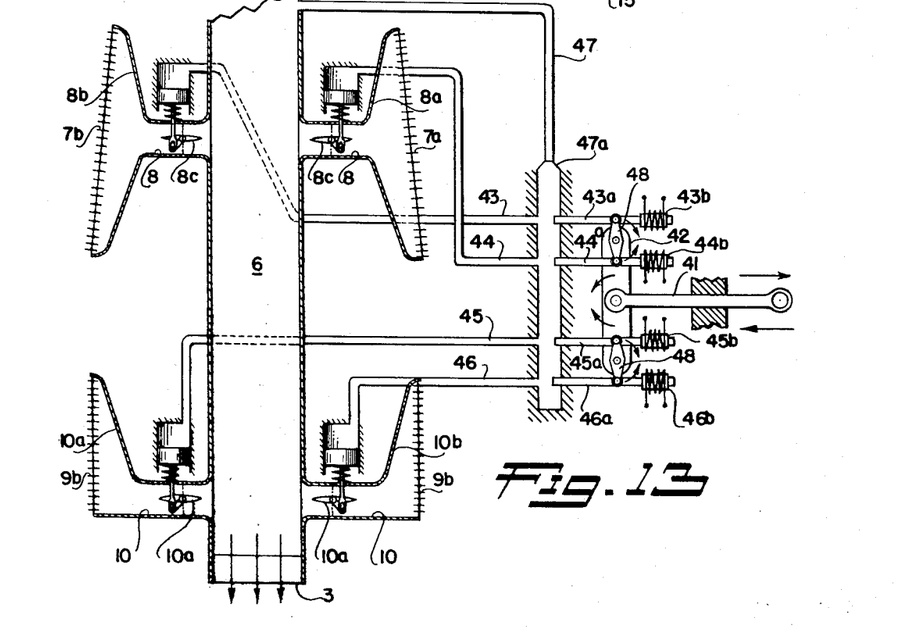
Figure 13 is a diagrammatic of the aircraft directional and vertical lift control system.

Referring now to Figure 13, there is diagrammatically shown a control system for controlling the fluid flow from longitudinal duct 6 to the forward and rearward elongated efflux nozzles 7 and 9. For vertical ascent, movement of a control rod 41 towards the right will cause control lever arm 42 to lift the plugs 43a, 44a, 45a and 46a permitting a flow of fluid pressure from longitudinal duct 6 to flow into passages 43, 44, 45 and 46 through main control passage 47, control passages 43 and 44 controlling the valves 8c in the right and left forward lateral passages 8a and 8b, while control passages 45 and 46 serve to actuate valves 10a in the aft or rearward lateral passages 10. By opening valves 8c and 10a, fluid from longitudinal duct 6 is in free communication to forward and aft chambers, 8a, 8b, 10b and 10c, with the fluid passing through the forward and rearward elongated efflux nozzles 7 and 9, which are located on the chines 13, the gases causing a reactive force upward upon exhaust through the elongated efflux nozzles. Both the forward and rearward elongated efflux nozzles 7 and 9 may be controllable so as to give a true upward reaction or a forward or rearward directed reaction, the latter two resulting in a propulsive force or braking force respectively.

Although propulsive nozzle 3 is the same as used in my copending application Serial Number 677,877 filed August 13, 1957, in that it comprises three pairs of horizontal vanes mounted pivotally on horizontal axes with each set of three vanes being separately and individually tiltable for pitch, roll and bank, a high degree of control is able to be achieved by the appropriate use of elongated efflux nozzles 7 and 9. Maximum vertical lift can be achieved by drawing control rod 41 to the right which pulls control lever arm 42 to the right removing the plugs 43a, 44a, 45a and 46a from the control passages 43, 44, 45 and 46, permitting fluid pressure in longitudinal duct 6 to pass through main control passage 47, main control manifold 47a and control passages 43, 44, 45 and 46 to the pistons controlling lateral passage valves 8c and 10a for opening passages 8 and 10 allowing the propulsive fluids to flow into chambers 8a, 8b, 10b and 10c for discharge from elongated efflux nozzles 7 and 9. It is to be noted that efflux nozzles 7 and 9 contain controllable valves of any of the variety of embodiments shown in my copending application Serial Number 677,877 identified above.

For the differentiable control aspect, each of the pairs of control passage plugs are mounted on control lever arm 42 by a rocker arm 48, the forward control passage plugs 43a and 44a being mounted on one rocker arm 48 and the rearward control passage plugs 45a and 46a being mounted on a second rocker arm 48. Each of the control passage plugs has a solenoid means associated therewith for individual actuation of one control passage plug relative to the other one of its pair, or to allow control of a pair of control passage plugs relative to the other pair. For an example, assuming that a bank to the right is to be made by the aircraft, control rod 41 will be pulled toward the right slightly so as to attempt to uncover all of the control passages 43, 44, 45 and 46. Concurrently, solenoids 43b and 45b will be activated causing control passage plugs 43a and 45a to be further removed from control passages 43 and 45, while control passage plugs 44a and 46a are seated on control passages 44 and 46 preventing fluid flow from the main control manifold 47a entering the control passages 44 and 46. Therefore the elongated efflux nozzles 7b and 9b on the left side of the aircraft will be supplied with fluid pressure from longitudinal duct 6 for a reactive discharge therethrough causing the left side of the aircraft to rise relative to the right side of the aircraft causing a bank to the right.

Pitch control is accomplished in the same manner by pulling control rod 41 slightly to the right and activating a pair of the solenoids together; that is activation of solenoids 43b and 44b to point the nose of the aircraft up and actuation of solenoids 45b and 46b to point the nose of the aircraft down. During flight such control variations can be scheduled into the individual elements through an electronic flight control system or programmer.

In operation when the aircraft is ready to take off the individual turbo-jet powerplants 5 can be started, each being started individually and having its combustion products discharge through turbo-jet starting spill gate means 34 until it attains the speed of the already running powerplants. The ram air bypass passage 19 is closed by means of petal valve 20 while each of the swing check valves 5b on the exhaust nozzles 5a of the nonoperative turbo-jet powerplants 5 are maintained closed. For vertical lift or vertical takeoff the control rod 41 is moved slightly to the right so as to uncover control passages 43, 44, 45 and 46 resulting in the elongated efflux nozzles 7 and 9 to be supplied with a fluid flow for discharge therethrough resulting in an upward reactive force. When sufficient altitude is reached the controllable valves in the elongated efflux nozzles can be adjusted so as to impart a rearward exhaust direction giving a forward translational velocity to the aircraft, and upon the gradual reduction of fluid pressure flow through the lateral passages the fluid in longitudinal duct 6 will then pass through the rear propulsive nozzle 3. During operation should a condition of ram air spill over the inlet lip 2a tend to occur, by ram air spill gate means 22 a pivoted valve member 23 is progressively opened allowing spill air to pass out therethrough in correct amount reducing the spill of ram air over the inlet lip 2a to an insignificant value.

In view of the fuselage shape having an inherent high L/D ratio at all flight speeds and attitudes, a most efficient use of propulsion is accomplished whether through the elongated efflux nozzles 7 and 9 or the propulsive nozzle 3, or a combination thereof. The elongated efflux through nozzles beneath the chines developes as a sheet which rapidly mixes with the ambient air, hence, the noise level will be comparatively low compared to large circular nozzle openings. It is also to be noted that the L/D ratio of the airplane will be benefited by the jet sheets beneath the chines by reducing spill along the flanks of the fuselage. As soon as the aircraft is at altitude and ready to cruise, the turbo-jet powerplants 5 can be shut down and cruising propulsion is attained by ram-jet power through the use of ram-jet burner means 11 at the end of longitudinal duct 6. By having the ram-jet burner means 11 at the aft end of longitudinal duct 6, the walls of the longitudinal duct 6 are not subject to the high heat of ram-jet combustion gases that would occur if the burner means 11 were at a point forward of its location.

Having described only a typical form of the invention I do not wish to be limited to the specific details herein set forth, but wish to reserve to myself any variations or modifications that may appear to those skilled in the art and fall within the scope of the following claims.

What is claimed is:

1. In an aircraft having a ram inlet and a spike therein, a ram air spill gate means comprising a valve controlled passage from the inlet interior to the atmosphere, a valve in said passage, pneumatic relay servo means controlling said valve, first pressure sensitive means responsive to substantially ambient pressure, and second pressure sensitive means responsive to pressure variations occurring due to ram air spill over the ram inlet lip, said pneumatic relay servo valve controlling means connected to the first and second pressure sensitive means whereby the valve is opened by a condition of ram air spill over the inlet lip indicated by a reduction of pressure level sensed by the second pressure sensitive means relative to the pressure level sensed by the first pressure sensitive means, said valve allowing passage of ram air from the inlet interior to the atmosphere directly thereupon reducing ram air spill over the inlet lip.

2. In an aircraft having a ram inlet and a spike therein, a ram air spill gate means comprising a valve controlled passage from the inlet interior to the atmosphere, a valve in said passage, pneumatic relay servo means controlling said valve, first pressure sensitive means in the forward portion of the inlet spike, and second pressure sensitive means on the outer surface of the inlet slightly downstream of the inlet lip, said pneumatic relay servo valve controlling means connected to the first and second pressure sensitive means whereby the valve is opened by a condition of ram air spill over the inlet lip indicated by a reduction of pressure level sensed by the second pressure sensitive means relative to the pressure level sensed by the first pressure sensitive means, said valve allowing passage of ram air from the inlet interior to the atmosphere directly thereupon reducing ram air spill over the inlet lip.

3. In an aircraft having a ram inlet, a plurality of turbo-jet powerplants located adjacent the downstream portion of the inlet, said powerplants arranged so as to provide an envelope for a ram air passage for ram-jet operation, and a valve means at the downstream end of each of the turbo-jet powerplants and the ram air passage whereby when the aircraft is on turbo-jet operation the ram air passage valve means is closed, and when the aircraft is on ram-jet operation all of the turbo-jet powerplant valve means are closed.

4. In an aircraft having a ram inlet, a plurality of turbo-jet powerplants located adjacent the downstream portion of the inlet, said powerplants arranged so as to provide an envelope for a ram air passage for ram-jet operation, a valve means at the downstream end of each of the turbo-jet powerplants and the ram air passage whereby when the aircraft is on turbo-jet operation the ram air passage valve means is closed and when the aircraft is on ram-jet operation all of the turbo-jet powerplant valve means are closed, and each of said valve means including a means for biasing said valve means to a closed position.

5. In an aircraft having a ram inlet, a plurality of turbo-jet powerplants located adjacent the downstream portion of the inlet, said powerplants arranged so as to provide an envelope for a ram air passage for ram-jet operation, and a valve means at the downstream end of each of the turbo-jet powerplants and the ram air passage whereby when the aircraft is on turbo-jet operation the ram air passage valve means is maintained closed by pressure generated by the turbo-jet powerplant reacting on the downstream side thereof and when the aircraft is on ram-jet operation all of the turbo-jet powerplant valve means are maintained closed by pressure generated by air passing through the ram air passage reacting on the downstream sides thereof.

6. In an aircraft having a ram inlet, a plurality of turbo-jet powerplants located adjacent the downstream portion of the inlet, said powerplants arranged so as to provide an envelope for a ram air passage for ram-jet operation, a first valve means at the downstream end of each of the turbo-jet powerplants, said first valve means of the substantially rectangular swing check type pivotally connected to one side of the downstream end of each turbo-jet powerplant, and a second valve means at the downstream end of the ram air passage, said first and second valve means adapted whereby when the aircraft is on turbo-jet operation the ram air passage valve means is closed and when the aircraft is on ram-jet operation all of the turbo-jet powerplant swing check valves are closed.

7. In an aircraft having a ram inlet, a plurality of turbo-jet powerplants located adjacent the downstream portion of the inlet, said powerplants arranged so as to provide an envelope for a ram air passage for ram-jet operation, a first valve means at the downstream end of each of the turbo-jet powerplants, and a second valve means of the iris type pivotally connected circumferentially around the ram air passage at the downstream end thereof, said first and second valve means adapted whereby when the aircraft is on turbo-jet operation the ram air passage iris valve is closed, and when the aircraft is on ram-jet operation all of the turbo-jet powerplant valve means are closed.

8. In an aircraft having a ram inlet with a plurality of turbo-jet powerplants located at the downstream portion of the inlet, a first valve means at the downstream end of each of the turbo-jet powerplants, and an engine starting spill gate means comprising a duct communicating each of the turbo-jet powerplants from a connection upstream of the downstream end first valve means to the atmosphere, and a second valve means at each connection of the duct to a turbo-jet powerplant whereby when less than all of the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants.

9. In an aircraft having a ram inlet with a plurality of turbo-jet powerplants located in the downstream portion of the inlet, a first valve means at the downstream end of each of the turbo-jet powerplants, and an engine starting spill gate means comprising an annular manifold duct, said duct connected to each of the turbo-jet powerplants upstream of the downstream end first valve means, second valve means at each connection of the duct to a turbo-jet powerplant, and means venting the duct to the atmosphere, said engine starting spill gate means arranged whereby when less than all of the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants.

10. A device as claimed in claim 7 wherein the first valve means is a substantially rectangular swing check valve pivotally connected to one side of the downstream end of each turbo-jet powerplant.

11. A device as claimed in claim 7 wherein the second valve means is a positive operated butterfly valve.

12. An aircraft fuselage having an inherent high $L/D$ ratio at all flight speeds formed by a substantially conical surface of revolution at the forward end for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, and the second surface extending from the first fuselage point to the second fuselage point as a flat triangle bounded laterally by slightly conical surfaces of decreasing radii in a rearward direction, the second surface extending aft of the second fuselage point as a flat surface of constant width.

13. An aircraft fuselage having an inherent high $L/D$ ratio at all flight speeds with a ram inlet at the forward end and a propulsive nozzle at the aft end formed by a substantially conical surface of revolution at the forward end for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft to the propulsive nozzle from the second fuselage point with the semi-circular radius constant, the second surface extending from the first fuselage point to the second fuselage point as a flat triangle bounded laterally by slightly conical surfaces of decreasing radii in a rearward direction, the second surface extending aft to the propulsive nozzle from the second fuselage point as a flat surface of constant width.

14. An aircraft fuselage having an inherent high $L/D$ ratio at all flight speeds formed by a substantially conical surface of revolution at the forward end for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a chine on both sides of the fuselage formed by the intersection of the first and second surfaces and extending from the first fuselage point to the aft end of the fuselage, and downward facing and laterally extending vertical lift efflux nozzle openings located beneath the chines whereby a smooth external aircraft surface contour is maintained.

15. In an aircraft the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a ram air spill gate means comprising a valve controlled passage from the inlet interior to the atmosphere on the second fuselage surface, a valve in said passage, and means controlling said valve, said valve controlling means being responsive to conditions of ram air spill over the lip of said inlet whereby said valve is opened for passage of ram air to the atmosphere to reduce the spill of ram air over the inlet lip.

16. In an aircraft the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a plurality of turbojet powerplants located adjacent the downstream portion of the inlet, said powerplants arranged so as to provide an envelope for a ram air passage for ram-jet operation, and the valve means at the downstream end of each of the turbo-jet powerplants and the ram air passage whereby when the aircraft is on turbo-jet operation the ram air passage valve means is closed, and when the aircraft is on ram-jet operation all of the turbo-jet powerplant valve means are closed.

17. In air aircraft the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a plurality of turbo-jet powerplants located at the downstream portion of the inlet, a first valve means at the downstream end of each of the turbo-jet powerplants, and an engine starting spill gate means comprising a duct communicating each of the turbo-jet powerplants from a connection upstream of the downstream end first valve means to the atmosphere on the second fuselage surface, and a second valve means at each connection of the duct to a turbo-jet powerplant whereby when less than all of the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back-pressure caused by already running turbo-jet powerplants.

18. In an aircraft having a ram inlet, a plurality of turbo-jet powerplants located adjacent the downstream portion of the inlet, said powerplants arranged so as to provide an envelope for a ram air passage for ram-jet operation, and a valve means at the downstream end of each of the turbo-jet powerplants and the ram air passage whereby when the aircraft is on turbo-jet operation the ram air passage valve means is closed, and when the aircraft is on ram-jet operation all of the turbo-jet powerplant valve means are closed, a ram air spill gate means comprising a valve controlled passage from the ram inlet interior to the atmosphere, a valve in said passage, and means controlling said valve, said valve controlling means being responsive to conditions of ram air spill over the lip of said inlet whether the aircraft is on turbo-jet or ram-jet operation whereby said valve is opened for passage of ram air to the atmosphere to reduce the spill of ram air over the inlet lip.

19. In an aircraft having a ram inlet, a plurality of turbo-jet powerplants located at the downstream portion of the inlet, a first valve means at the downstream end of each of the turbo-jet powerplants, an engine starting spill gate means comprising a duct communicating each of the turbo-jet powerplants from a connection upstream of the downstream end first valve means to the atmosphere, a second valve means at each connection of the duct to a turbo-jet powerplant whereby when less than all of the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back-pressure caused by already running turbo-jet powerplants, a ram air spill gate means comprising a valve controlled passage from the inlet interior to the atmosphere, a valve in said passage, and means controlling said valve, said valve controlling means being responsive to conditions of ram air spill over the lip of said inlet whereby said valve is opened for passage of ram air to the atmosphere to reduce the spill of ram air over the inlet lip.

20. In an aircraft having a ram inlet, a plurality of turbo-jet powerplants located adjacent the downstream portion of the inlet, said powerplants arranged so as to provide an envelope for a ram air passage for ram-jet operation, a first valve means at the downstream end of each of the turbo-jet powerplants and the ram air passage whereby when the aircraft is on turbo-jet operation the ram air passage valve means is closed and when the aircraft is on ram-jet operation all of the turbo-jet powerplant valve means are closed, an engine starting spill gate means comprising a duct communicating each of the turbo-jet powerplants from a connection upstream of the downstream end first valve means to the atmosphere, and a second valve means at each connection of the duct to a turbo-jet powerplant whereby when less than all of the turbo-jet powerplants are operating and the first valve means on each turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants.

21. In an aircraft the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a plurality of turbo-jet powerplants located adjacent the downstream portion of the inlet, said powerplants arranged so as to provide an envelope for a ram air passage for ram-jet operation, valve means at the downstream end of each of the turbo-jet powerplants and the ram air passage whereby when the aircraft is on turbo-jet operation the ram air passage valve means is closed and when the aircraft is on ram-jet operation all of the turbo-jet powerplant valve means are closed, a ram air spill gate means comprising a valve controlled passage from the inlet interior to the atmosphere on the second fuselage surface, a valve in said passage, and means controlling said valve, said valve controlling means being responsive to conditions of ram air spill over the lip of said inlet whether the aircraft is on turbo-jet or ram-jet operation whereby said valve is opened for passage of ram air to the atmosphere to reduce the spill of ram air over the inlet lip.

22. In an aircraft the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a plurality of turbo-jet powerplants located at the downstream portion of the inlet, a first valve means at the downstream end of each of the turbo-jet powerplants, and an engine starting spill gate means comprising a duct communicating each of the turbo-jet powerplants from a connection upstream of the downstream end first valve means to the atmosphere on the second fuselage surface, a second valve means at each connection of the duct to a turbo-jet powerplant whereby when less than all of the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants, a ram air spill gate means comprising a valve controlled passage from the inlet interior to the atmosphere on the second fuselage surface, a valve in said passage, and means controlling said valve, said valve controlling means being responsive to conditions of ram air spill over the lip of said inlet whereby said valve is opened for passage of ram air to the atmosphere to reduce the spill of ram air over the inlet lip.

23. In an aircraft, the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending aft of the second fuselage point as a flat surface of constant width, a plurality of turbo-jet powerplants located adjacent the downstream portion of the inlet, said powerplants arranged so as to provide an envelope for a ram air passage for ram-jet operation, a first valve means at the downstream end of each of the turbo-jet powerplants and the ram air passage whereby when the aircraft is on turbo-jet operation the ram air passage first valve means is closed, and when the aircraft is on ram-jet operation all of the turbo-jet powerplant first valve means are closed, an engine starting spill gate means comprising a duct communicating with each of the turbo-jet powerplants from a connection upstream of the downstream end first valve means to the atmosphere on the second fuselage surface, and a second valve means at each connection of the duct to a turbo-jet powerplant whereby when less than all the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants.

24. In an aircraft having a ram inlet, a plurality of turbo-jet powerplants located adjacent the downstream portion of the inlet, said powerplants arranged so as to provide an envelope for a ram air passage for ram-jet operation, a first valve means at the downstream end of each of the turbo-jet powerplants and the ram air passage whereby when the aircraft is on turbo-jet operation the ram air passage first valve means is closed, and when the aircraft is on ram-jet operation all of the turbo-jet powerplant first valve means are closed, an engine starting spill gate means comprising a duct communicating each of the turbo-jet powerplants from a connection upstream of the downstream end first valve means to the atmosphere, a second valve means at each connection of the duct to a turbo-jet powerplant whereby when less than all of the turbo-jet powerplants are operating and the first valve means on each shut down turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants, a ram air spill gate means comprising a valve controlled passage from the inlet interior to the atmosphere, a valve in said passage, and means controlling said valve, said valve controlling means being responsive to conditions of ram air spill over the lip of said inlet whether the aircraft is on turbo-jet or ram-jet operation whereby said valve is opened for passage of ram air to the atmosphere to reduce the spill of ram air over the inlet lip.

25. In an aircraft the combination of a fuselage having an inherent high $L/D$ ratio at all flight speeds, a ram inlet at the forward end of said fuselage, the fuselage formed by a substantially conical surface of revolution extending aft from the inlet lip for a short length to a first fuselage point, the outer fuselage surface transforming to a first and second surface at the first fuselage point, the first surface extending from the first fuselage point to a second fuselage point mid-length of the fuselage as a semi-circular shape of increasing radius, the first surface extending aft from the second fuselage point with the semi-circular radius constant, the second surface extending from the first fuselage point to the second fuselage point as a flat triangle bounded laterally by slightly conical surfaces of decreasing radii in a rearward direction, the second surface extending aft of the second fuselage point as a flat surface of constant width, a plurality of turbo-jet powerplants located adjacent the downstream portion of the inlet, said powerplants arranged so as to provide an envelope for a ram air passage for ram-jet operation, a first valve means at the downstream end of each of the turbo-jet powerplants and the ram air passage whereby when the aircraft is on turbo-jet operation the ram air passage first valve means is closed, and when the aircraft is on ram-jet operation all of the turbo-jet powerplant first valve means are closed, an engine starting spill gate means comprising a duct communicating each of the turbo-jet powerplants from a connection upstream of the downstream end first valve means to the atmosphere on the second fuselage surface, a second valve means at each connection of the duct to a turbo-jet powerplant whereby when less than all of the turbo-jet powerplants are operating and the first valve means on on each shut down turbo-jet powerplant is closed, a shut down turbo-jet powerplant can be started by opening its second valve means to allow the starting exhaust from that powerplant to pass through the duct to the atmosphere for ease of starting without adverse effects of back pressure caused by already running turbo-jet powerplants, a ram air spill gate means comprising a valve controlled passage from the inlet interior to the atmosphere on the second fuselage surface, a valve in said passage, and means controlling said valve, said valve controlling means being responsive to conditions of ram air spill over the lip of said inlet whether the aircraft is on turbo-jet or ram-jet operation whereby said valve is opened for passage of ram air to the atmosphere to reduce the spill of ram air over the inlet lip.

References Cited in the file of this patent

UNITED STATES PATENTS

| | | |
|---|---|---|
| 1,328,040 | Finley | Jan. 13, 1920 |
| 1,684,240 | Pigeon | Sept. 11, 1928 |
| 2,577,919 | Roy | Dec. 11, 1951 |
| 2,699,906 | Lee | Jan. 18, 1955 |
| 2,811,828 | McLafferty | Nov. 5, 1957 |
| 2,832,192 | Budish | Apr. 29, 1958 |
| 2,865,580 | Marshall | Dec. 23, 1958 |